(12) United States Patent
Maeda

(10) Patent No.: US 8,691,125 B2
(45) Date of Patent: Apr. 8, 2014

(54) INJECTION MOLDING APPARATUS AND METHOD FOR MANUFACTURING LONG MOLDED ARTICLE

(75) Inventor: Hiroshi Maeda, Mie (JP)

(73) Assignee: Fuji Xerox Co., Ltd., Tokyo (JP)

( * ) Notice: Subject to any disclaimer, the term of this patent is extended or adjusted under 35 U.S.C. 154(b) by 309 days.

(21) Appl. No.: 13/206,096

(22) Filed: Aug. 9, 2011

(65) Prior Publication Data

US 2012/0242006 A1 Sep. 27, 2012

(30) Foreign Application Priority Data

Mar. 25, 2011 (JP) ................................. 2011-068747

(51) Int. Cl.
*B29C 45/73* (2006.01)

(52) U.S. Cl.
USPC ................... 264/40.6; 264/328.16; 425/144; 425/548

(58) Field of Classification Search
USPC ...................... 264/40.6, 327, 328.14, 328.16; 425/143, 144, 548, 552
See application file for complete search history.

(56) References Cited

U.S. PATENT DOCUMENTS

| 4,548,773 | A  | * | 10/1985 | Suh et al. ..................... 264/40.6 |
| 5,772,933 | A  | * | 6/1998 | Kotzab .......................... 264/40.6 |
| 6,312,628 | B1 | * | 11/2001 | Wieder et al. .............. 264/37.27 |
| 6,793,868 | B2 | * | 9/2004 | Kanematsu et al. .......... 264/500 |

FOREIGN PATENT DOCUMENTS

| JP | 01051913 | * | 2/1989 |
| JP | A-2001-062870 |   | 3/2001 |

* cited by examiner

*Primary Examiner* — Jill Heitbrink
(74) *Attorney, Agent, or Firm* — Oliff PLC

(57) ABSTRACT

An injection molding apparatus includes a first mold and a second mold, a cavity formed by clamping the first mold and the second mold, and includes a portion where the ratio of a first dimension and a second dimension changes continuously such that a portion where the ratio of the first dimension of a pair of first surfaces, and the second dimension of a pair of second surfaces becomes 1 locates in an intermediate portion of the cavity in a longitudinal direction of the long shape; and a first temperature adjusting circuit that is provided at the first mold and the second mold to adjust a temperature within a range where the second dimension of the second surfaces is greater than the first dimension of the first surfaces such that the temperature of the pair of first surfaces becomes higher than the temperature of the pair of second surfaces.

6 Claims, 16 Drawing Sheets

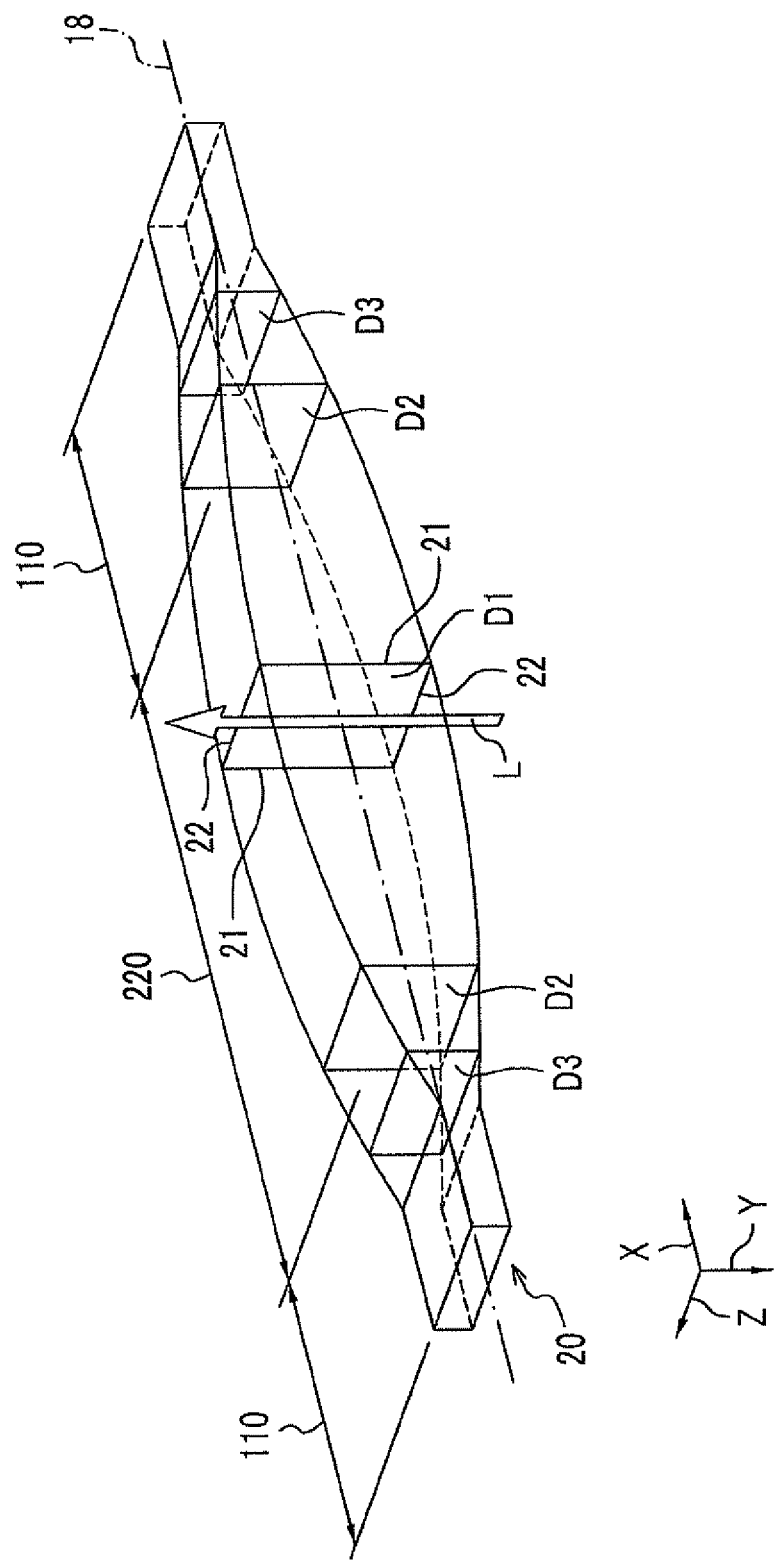

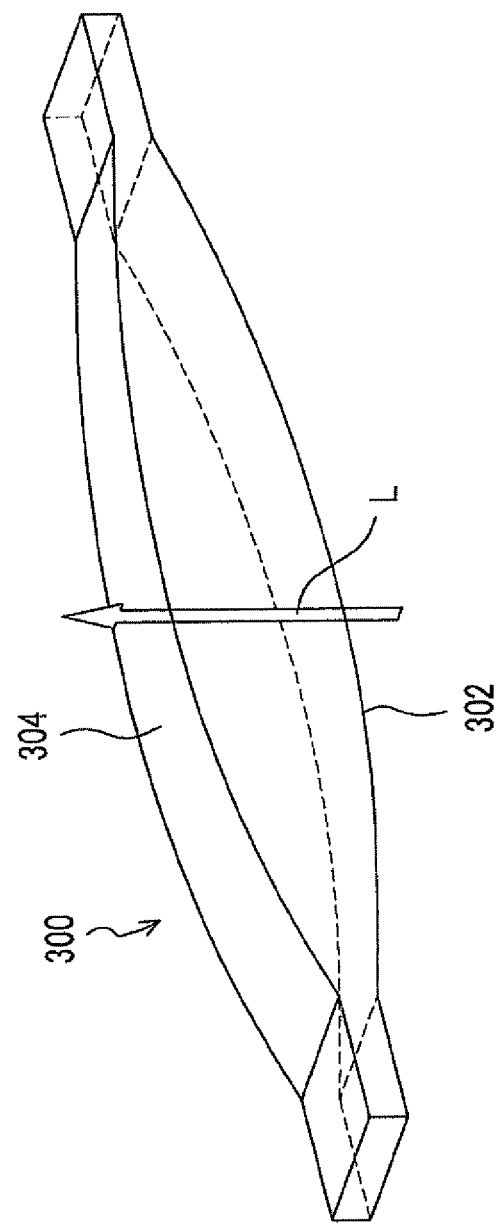

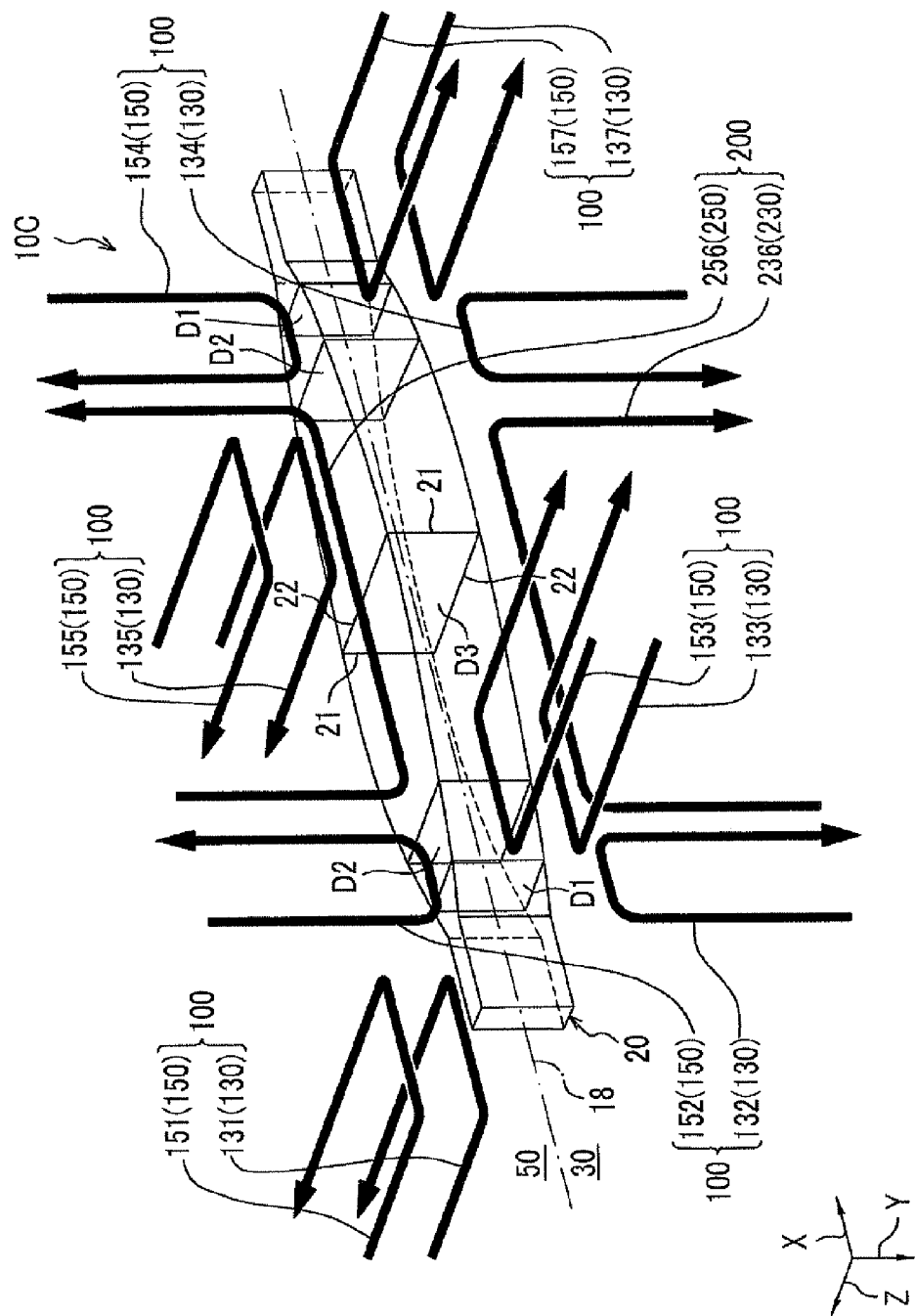

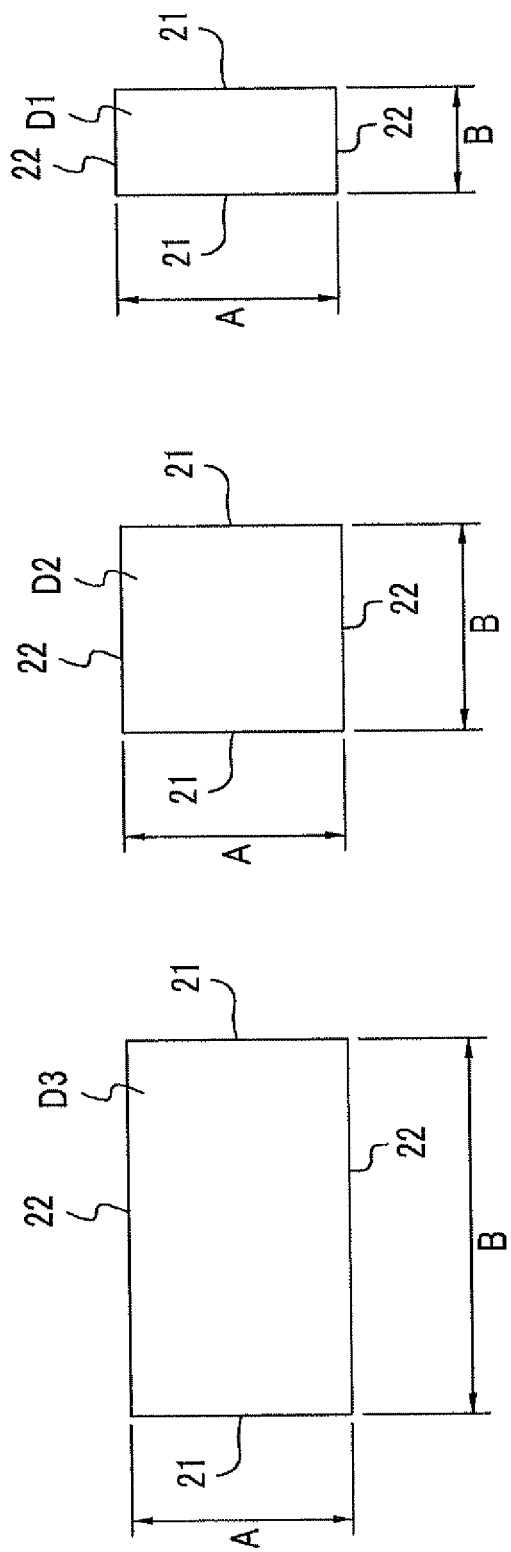

INJECTION MOLDING APPARATUS AND METHOD FOR MANUFACTURING LONG MOLDED ARTICLE

CROSS-REFERENCE TO RELATED APPLICATIONS

This application is based on and claims priority under 35 USC 119 from Japanese Patent Application No. 2011-068747 filed Mar. 25, 2011.

BACKGROUND

Technical Field

The present invention relates to an injection molding apparatus and a method for manufacturing a long molded article.

SUMMARY

According to an aspect of the invention, there is provided an injection molding apparatus including a first mold; a second mold that moves relative to the first mold; the first mold and the second mold being clamped to form a cavity that has a long shape, and includes a portion where a ratio of a first dimension and a second dimension changes continuously such that the portion where the ratio of the first dimension of a pair of first surfaces that face each other along a mold opening direction in a section orthogonal to a longitudinal direction, and the second dimension of a pair of second surfaces that face each other along a direction perpendicular to the mold opening direction becomes 1 locates in an intermediate portion of the cavity in a longitudinal direction of the long shape; a first temperature adjusting circuit that is provided at the first mold and the second mold to adjust a temperature within a range where the second dimension of the second surfaces is greater than the first dimension of the first surfaces such that the temperature of the pair of first surfaces becomes higher than the temperature of the pair of second surfaces; and a second temperature adjusting circuit that is provided at the first mold and the second mold to adjust a temperature within a range where the second dimension of the second surfaces is smaller than the first dimension of the first surfaces such that the temperature of the pair of first surfaces within the range becomes lower than the temperature of the pair of first surfaces whose temperature is adjusted by the first temperature adjusting circuit.

BRIEF DESCRIPTION OF THE DRAWINGS

Exemplary embodiments of the present invention will be described in detail based on the following figures, wherein:

FIG. 2 is a perspective view showing the configuration of a cavity;

FIG. 10 is a perspective view showing the configuration of an fθ lens;

FIG. 14 is a perspective view showing the configuration of a third embodiment;

FIGS. 15A to 15C are cross-sectional views showing orthogonal sections orthogonal to the longitudinal direction of a cavity in the third embodiment.

DETAILED DESCRIPTION

Hereinafter, exemplary embodiments related to the invention will be described with reference to the drawings.

(Configuration of Injection Molding Apparatus Related to First Embodiment)

Figure 1:
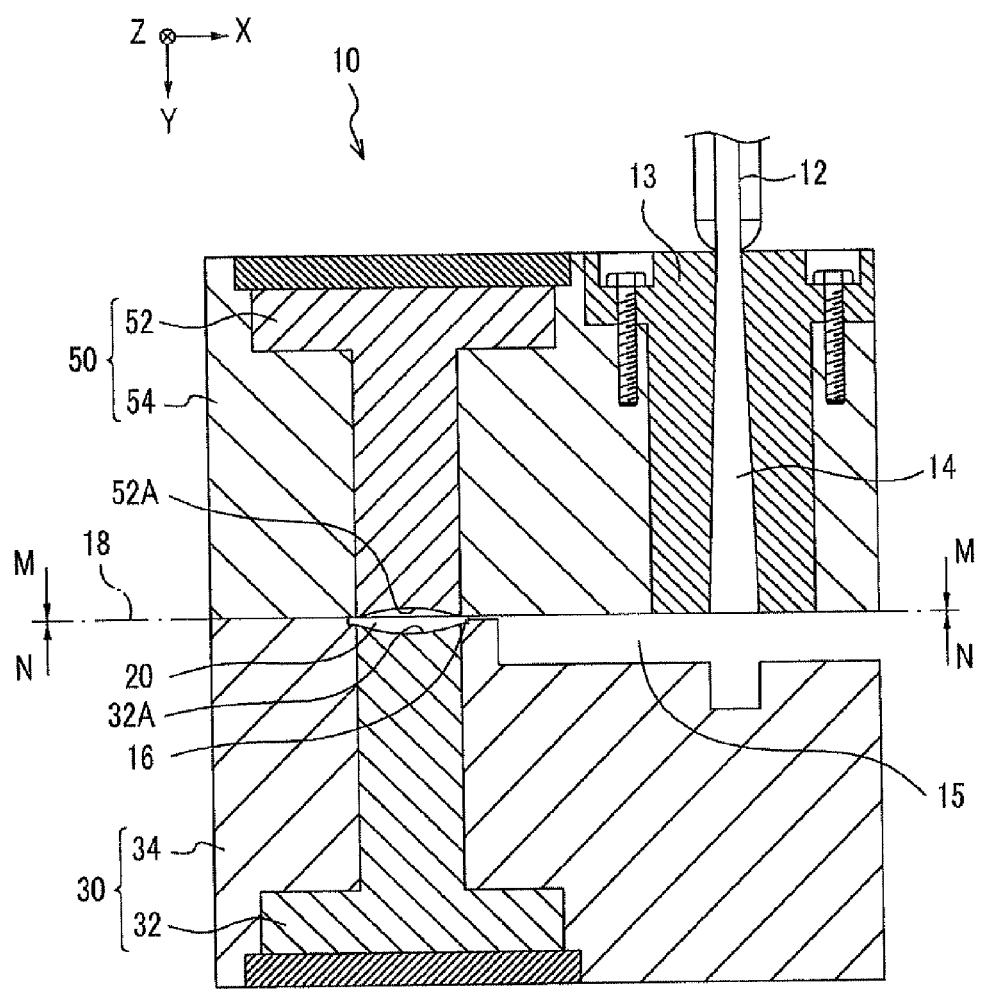
FIG. 1 is a schematic view showing the configuration of an injection molding apparatus related to the present exemplary embodiment.

First, the configuration of an injection molding apparatus related to the first embodiment will be described. FIG. 1 is a schematic view showing the configuration of the injection molding apparatus related to the first embodiment. In addition, although a cavity 20 is provided also on the right of FIG. 1, the illustration thereof is omitted.

The injection molding apparatus 10 is an apparatus for injection-molding an fθ lens 300 (refer to FIG. 10) serving as an example of a long molded article. The fθ lens 300 is used for an exposure device (optical scanning device) of an image forming apparatus, such as a printer, and as shown in FIG. 10, has an incidence plane 302 that light L enters, and an emission plane 304 from which the light L that has entered from the incidence plane 302 is emitted.

In addition, the long molded article that is injection-molded by the injection molding apparatus 10 is not limited to the fθ lens 300, and may be other resin molded articles.

As shown in FIG. 1, the injection molding apparatus 10 includes a fixed mold 50 serving as an example of a first mold, and a movable mold 30 serving as an example of a second mold that moves relative to the fixed mold 50. An injection mold in the injection molding apparatus 10 is constituted by the fixed mold 50 and the movable mold 30. The fixed mold 50 and the movable mold 30 are allowed to be split by a parting line face 18, and the cavity 20 that is made long along the parting line face 18 is formed by clamping the fixed mold 50 and the movable mold 30. In addition, the movable mold 30 is opened in the direction of an arrow Y of FIG. 1 with respect to the fixed mold 50.

Specifically, the fixed mold 50 forms one-side portion (upper portion in FIG. 1) of the parting line face 18 in the cavity 20, and the movable mold 30 forms the other-side portion (lower portion in FIG. 1) of the parting line face 18 in the cavity 20.

The fixed mold 50 includes a nest 52 that has a forming surface 52A for forming the portion of a second surface 22

(refer to FIGS. 3A to 3C) of the cavity 20 that becomes the emission plane 304, and a frame nest 54 that forms a storage space that stores the nest 52, and is frame-shaped as seen in the direction of an arrow N. The forming surface 52A becomes a transfer surface for molding the emission plane 304 that is an optical surface of the fθ lens 300.

The movable mold 30 includes a movable nest 32 that has a forming surface 32A for forming the portion of the second surface 22 (refer to FIGS. 3A to 3C) of the cavity 20 that becomes the incidence plane 302, and a frame nest 34 that forms a storage space that stores the movable nest 32, and is frame-shaped as seen in the direction of an arrow M. The forming surface 32A becomes a transfer surface for molding the incidence plane 302 that is an optical surface of the fθ lens 300. The movable nest 32 is adapted to be pressurized toward the fixed mold 50, and to be able to compress the resin filled into the cavity 20.

In addition, the injection molding apparatus 10 includes a sprue bush 13 that is provided in the fixed mold 50 to allow molten resin to be poured thereinto, a sprue 14 that is formed in the sprue bush 13 to allow the molten resin to pass therethrough, a runner 15 that is formed in the movable mold 30 to allow the molten resin pass therethrough, and a gate 16 serving as an entrance of the cavity 20.

(Configuration of Cavity 20 in Injection Molding Apparatus 10)

Figure 3C:
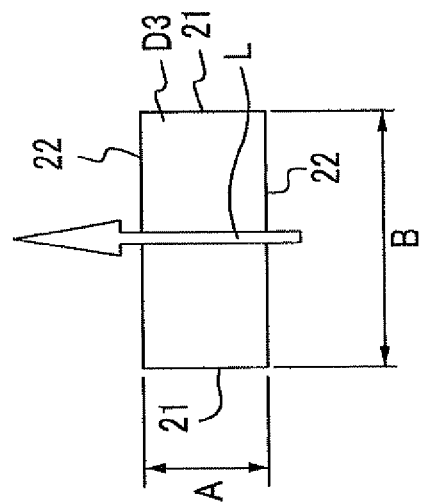
FIGS. 3A to 3C are cross-sectional views showing orthogonal sections orthogonal to the longitudinal direction of the cavity.
Figure 3B:
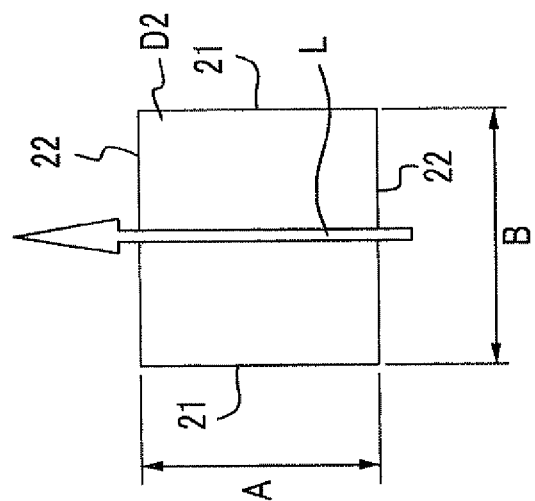
Figure 3A:
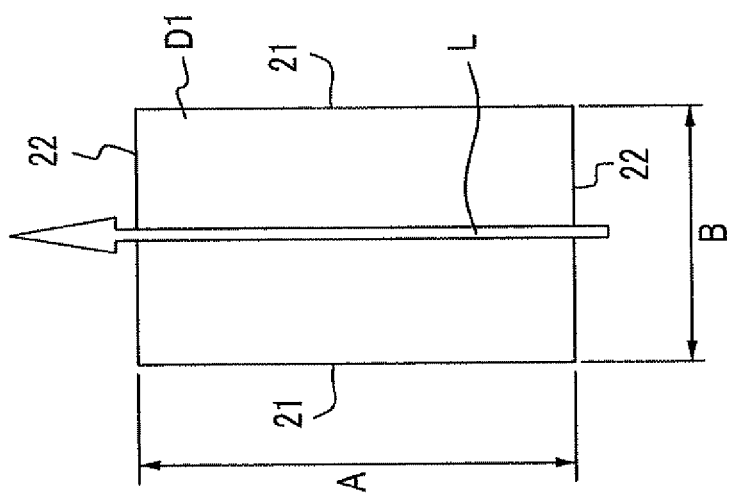

FIG. 2 is a perspective view showing the configuration of the cavity 20. FIGS. 3A to 3C are cross-sectional views showing orthogonal sections orthogonal to the longitudinal direction of the cavity 20.

In the cavity 20, as shown in FIG. 2, when orthogonal sections orthogonal to the longitudinal direction of the cavity at the central portion of the cavity 20 in the longitudinal direction (the direction of an arrow X in FIG. 2), outside the central portion in the longitudinal direction, and further outside the central portion in the longitudinal direction (the direction of the arrow X in FIG. 2) are defined as D1, D2, and D3, the relationship between the dimension A of a pair of first surfaces 21 that faces each other in a mold opening direction (the direction of an arrow Y in FIG. 2), and the dimension B of a pair of second surfaces 22 that face each other along a direction (the direction of the arrow X in FIG. 2) perpendicular to the mold opening direction is as follows. That is, Dimension A>Dimension B is satisfied in the orthogonal section D1 as shown in FIG. 3A, Dimension A=Dimension B is satisfied in the orthogonal section D2 as shown in FIG. 3B, and Dimension A<Dimension B is satisfied in the orthogonal section D3 as shown in FIG. 3C.

That is, the cavity 20 includes a portion where the ratio of the dimension A and the dimension B changes continuously such that a portion (the above orthogonal section D2) where the ratio of the dimension A of the pair of first surfaces 21 and the dimension B of the pair of second surfaces 22 becomes 1 in an orthogonal section is generated at a longitudinal intermediate portion.

In the present exemplary embodiment, the second surfaces 22 of the cavity 20 become optical surfaces where a higher precision than other faces (the first surfaces 21) is required in the fθ lens 300 to be molded. Specifically, the second surface 22 on the fixed mold 50 side becomes the emission plane 304 of the fθ lens 300, and the second surface 22 on the movable mold 30 side becomes the incidence plane 302 of the fθ lens 300. In addition, specifically, the portions that form the planes of the cavity 20 at both longitudinal ends in the second surfaces 22 of the cavity 20 do not become optical surfaces, but the portion that forms a curved surface at the center of the cavity becomes an optical surface. In addition, in FIGS. 2 and 3A to 3C, an arrow L indicates the direction of light irradiation in a case where the fθ lens 300 is molded.

(Configuration of Temperature Adjusting Circuit in Injection Molding Apparatus 10)

Figure 4:
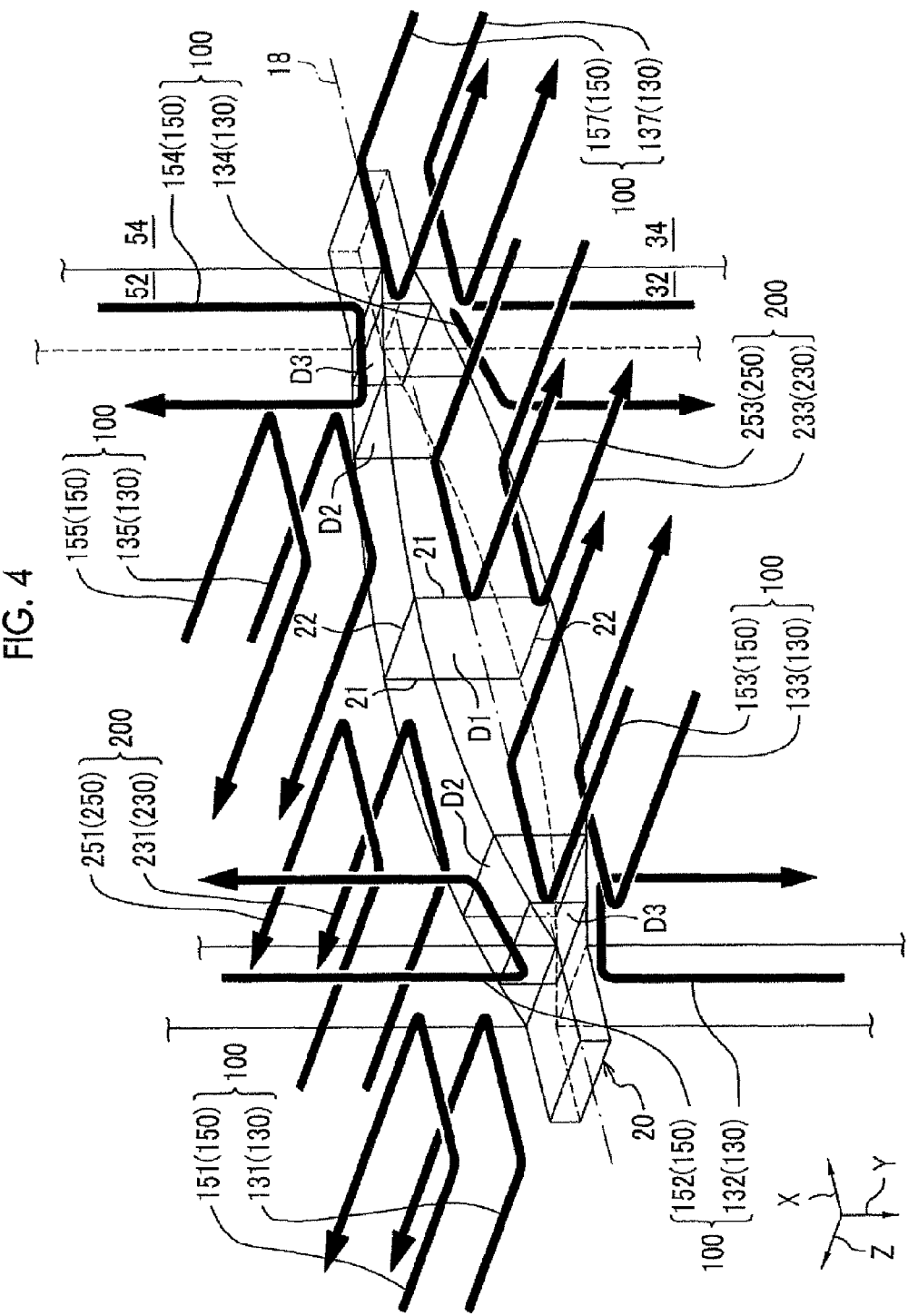
FIG. 4 is a perspective view showing the configuration of a temperature adjusting circuit.
Figure 5:
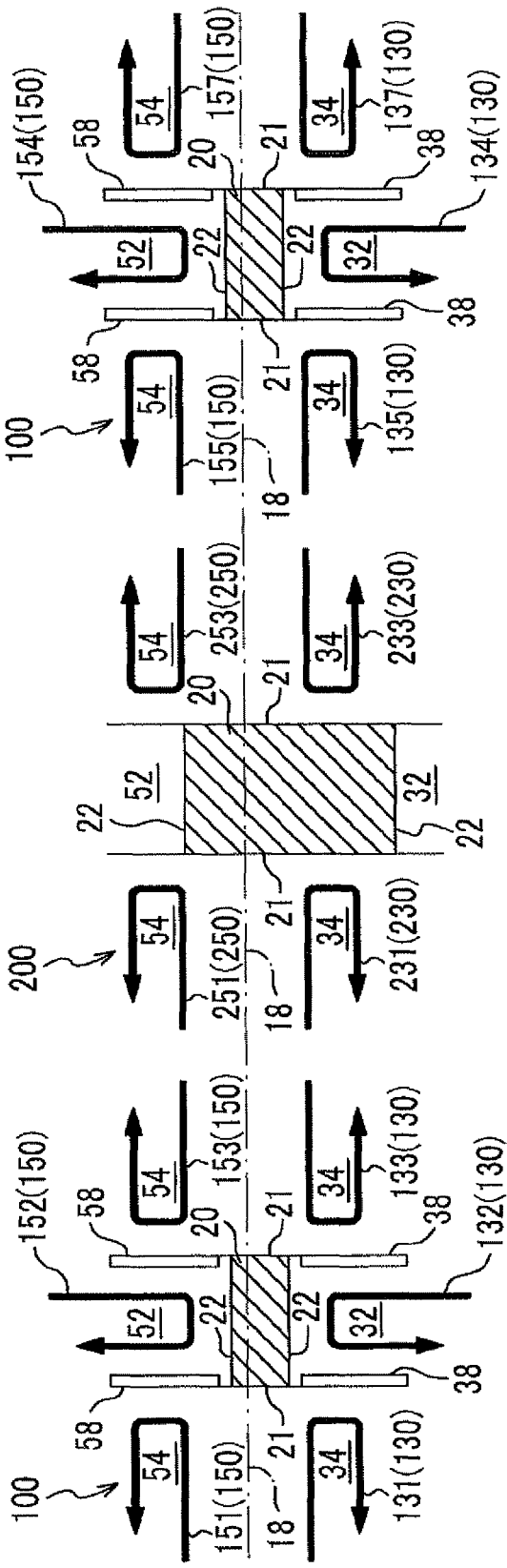
FIGS. 5A to 5C are side views showing the configuration of the temperature adjusting circuit.

FIG. 4 is a perspective view showing the configuration of a temperature adjusting circuit. FIGS. 5A to 5C are side views showing the configuration of the temperature adjusting circuit.

As shown in FIG. 4, the injection molding apparatus 10 includes a first temperature adjusting circuit 100 that is provided in the fixed mold 50 and the movable mold 30 to adjust a temperature within a range where the dimension B of the second surfaces 22 is greater than the dimension A of the first surfaces 21. That is, the first temperature adjusting circuit 100 is a circuit that adjusts the temperature of a portion 110 (refer to FIG. 2) longitudinally outside the orthogonal section D2 in the cavity 20.

Specifically, the first temperature adjusting circuit 100 includes a circuit 150 for a fixed mold provided at the fixed mold 50, and a circuit 130 for a movable mold provided at the movable mold 30.

The circuit 150 for a fixed mold, as shown in FIGS. 4 and 5A, includes first surface circuits 151 and 153 that are provided in the frame nest 54 of the fixed mold 50 to adjust the temperature of the respective first surfaces 21 at one end (the left end in FIG. 4) of the cavity 20 in the longitudinal direction, and a second surface circuit 152 that is provided in the nest 52 of the fixed mold 50 to adjust the temperature of the second surface 22 at one end (the left end in FIG. 4) of the cavity 20 in the longitudinal direction.

Additionally, the circuit 150 for a fixed mold, as shown in FIGS. 4 and 5C, includes first surface circuits 155 and 157 that are provided in the frame nest 54 of the fixed mold 50 to adjust the temperature of the respective first surfaces 21 at the other end (the right end in FIG. 4) of the cavity 20 in the longitudinal direction, and a second surface circuit 154 that is provided in the nest 52 of the fixed mold 50 to adjust the temperature of the second surface 22 at the other end (the right end in FIG. 4) of the cavity 20 in the longitudinal direction.

The circuit 130 for a movable mold, as shown in FIGS. 4 and 5A, includes first surface circuits 131 and 133 that are provided in the frame nest 34 of the movable mold 30 to adjust the temperature of the respective first surfaces 21 at one end (the left end in FIG. 4) of the cavity 20 in the longitudinal direction, and a second surface circuit 132 that is provided in the movable nest 32 of the movable mold 30 to adjust the temperature of the second surface 22 at one end (the left end in FIG. 4) of the cavity 20 in the longitudinal direction.

Additionally, the circuit 130 for a movable mold, as shown in FIGS. 4 and 5C, includes first surface circuits 135 and 137 that are provided in the frame nest 34 of the movable mold 30 to adjust the temperature of the respective first surfaces 21 at the other end (the right end in FIG. 4) of the cavity 20 in the longitudinal direction, and a second surface circuit 134 that is provided in the movable nest 32 of the movable mold 30 to adjust the temperature of the second surface 22 at the other end (the right end in FIG. 4) of the cavity 20 in the longitudinal direction.

Moreover, the injection molding apparatus 10 includes a second temperature adjusting circuit 200 that is provided in the fixed mold 50 and the movable mold 30 to adjust a temperature within a range where the dimension B of the second surfaces 22 is smaller than the dimension A of the first surfaces 21. That is, the second temperature adjusting circuit 200 is a circuit that adjusts the temperature of a portion 220 (refer to FIG. 2) longitudinally nearer to the central side than the orthogonal section D2 in the cavity 20.

Specifically, the second temperature adjusting circuit 200 includes a circuit 250 for a fixed mold provided at the fixed mold 50, and a circuit 230 for a movable mold provided at the movable mold 30.

As shown in FIGS. 4 and 5B, the circuit 250 for a fixed mold includes first surface circuits 251 and 253 that are provided in the frame nest 54 of the fixed mold 50 to adjust the temperature of the respective first surfaces 21 in the longitudinal central portion 220 of the cavity 20.

The circuit 230 for a movable mold includes first surface circuits 231 and 233 that are provided in the frame nest 34 of the movable mold 30 to adjust the temperature of the respective first surfaces 21 in the longitudinal central portion of the cavity 20.

Figure 6:
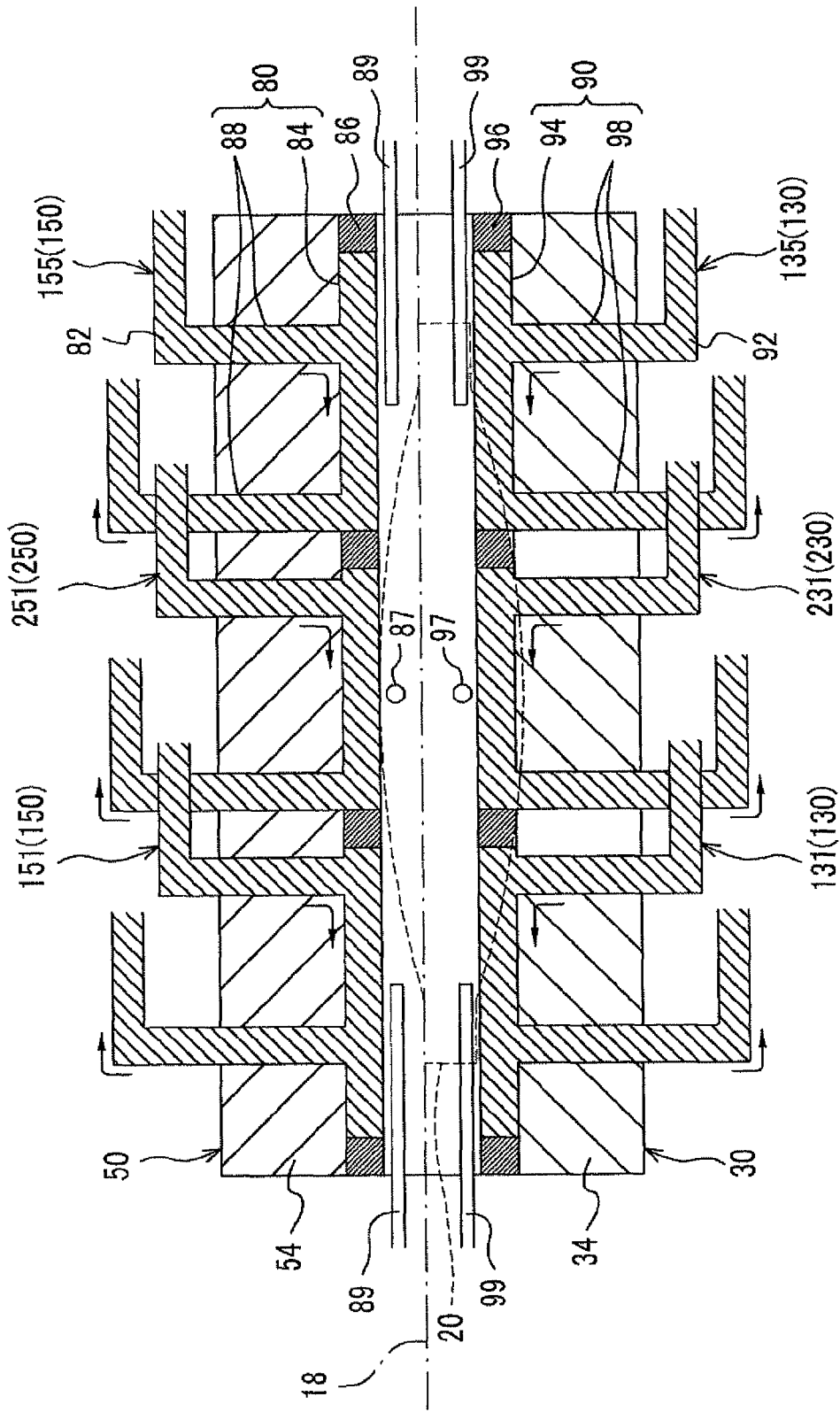
FIG. 6 is a cross-sectional view showing the specific configuration of the temperature adjusting circuit in a frame nest of a movable mold and a frame nest of a fixed mold.

The first surface circuits 151 and 155 that adjust the temperature of the first surfaces 21 on one side (on the deep side in FIG. 4 and on the left side of FIGS. 5A and 5C) of the cavity 20 in the circuit 150 for a fixed mold of the first temperature adjusting circuit 100, and the first surface circuit 251 that adjusts the temperature of the first surface 21 on one side (on the deep side in FIG. 4 and on the left side of FIG. 5B) of the cavity 20 in the circuit 250 for a fixed mold of the second temperature adjusting circuit 200, as shown in FIG. 6, are configured by making oil 82 flow into a channel 80 formed in the frame nest 54 of the fixed mold 50 so as to pass through the vicinities of the first surfaces 21. In addition, the channel 80 is configured by forming one through hole 84 that penetrates in the longitudinal direction of the cavity 20, sealing the through hole 84 using a sealing member 86 to partition the through hole into three regions, and forming two connection holes 88 that are formed in the partitioned respective regions in a direction orthogonal to the through hole 84 and are connected to the through hole 84. A temperature sensor 89 that detects the temperature of each portion 110 (refer to FIG. 2) longitudinally outside the orthogonal section D2 in the cavity 20, and a temperature sensor 87 that detects the temperature of the portion 220 (refer to FIG. 2) nearer to the longitudinal central portion than the orthogonal section D2 in the cavity 20 are provided in the vicinity of the first surfaces 21 of the cavity 20.

The first surface circuits 153 and 157 that adjust the temperature of the first surfaces 21 on the other side (on the near side in FIG. 4 and on the right side of FIGS. 5A and 5C) of the cavity 20 in the circuit 150 for a fixed mold of the first temperature adjusting circuit 100, and the first surface circuit 253 that adjusts the temperature of the first surface 21 on the other side (on the near side in FIG. 4 and on the right side of FIG. 5B) of the cavity 20 in the circuit 250 for a fixed mold of the second temperature adjusting circuit 200, though not shown, are formed similarly to the first surface circuits 151 and 155 and the first surface circuit 251 on one side (the deep side in FIG. 4) of the cavity 20.

The first surface circuits 131 and 135 that adjust the temperature of the first surfaces 21 on one side (on the deep side in FIG. 4) of the cavity 20 in the circuit 130 for a movable mold of the first temperature adjusting circuit 100, and the first surface circuit 231 that adjusts the temperature of the first surface 21 on one side (on the deep side in FIG. 4) of the cavity 20 in the circuit 230 for a movable mold of the second temperature adjusting circuit 200, as shown in FIG. 6, are configured by making oil 92 flow into a channel 90 formed in the frame nest 34 of the movable mold 30 so as to pass through the vicinities of the first surfaces 21. In addition, the channel 90 is configured by forming one through hole 94 that penetrates in the longitudinal direction of the cavity 20, sealing the through hole 94 using a sealing member 96 to partition the through hole into three regions, and forming two connection holes 98 that are formed in the partitioned respective regions in a direction orthogonal to the through hole 94 and are connected to the through hole 94. A temperature sensor 99 that detects the temperature of each portion longitudinally outside the orthogonal section D2 in the cavity 20, and a temperature sensor 97 that detects the temperature of the portion nearer to the longitudinal central portion than the orthogonal section D2 in the cavity 20 are provided in the vicinity of the first surfaces 21 of the cavity 20.

The first surface circuits 133 and 137 that adjust the temperature of the first surfaces 21 on the other side (on the near side in FIG. 4) of the cavity 20 in the circuit 130 for a movable mold of the first temperature adjusting circuit 100, and the first surface circuit 233 that adjust the temperature of the first surface 21 on the other side (on the near side in FIG. 4) of the cavity 20 in the circuit 230 for a movable mold of the second temperature adjusting circuit 200, though not shown, are formed similarly to the first surface circuits 131 and 135 and the first surface circuit 231 on one side (the deep side in FIG. 4) of the cavity 20.

Figure 7:
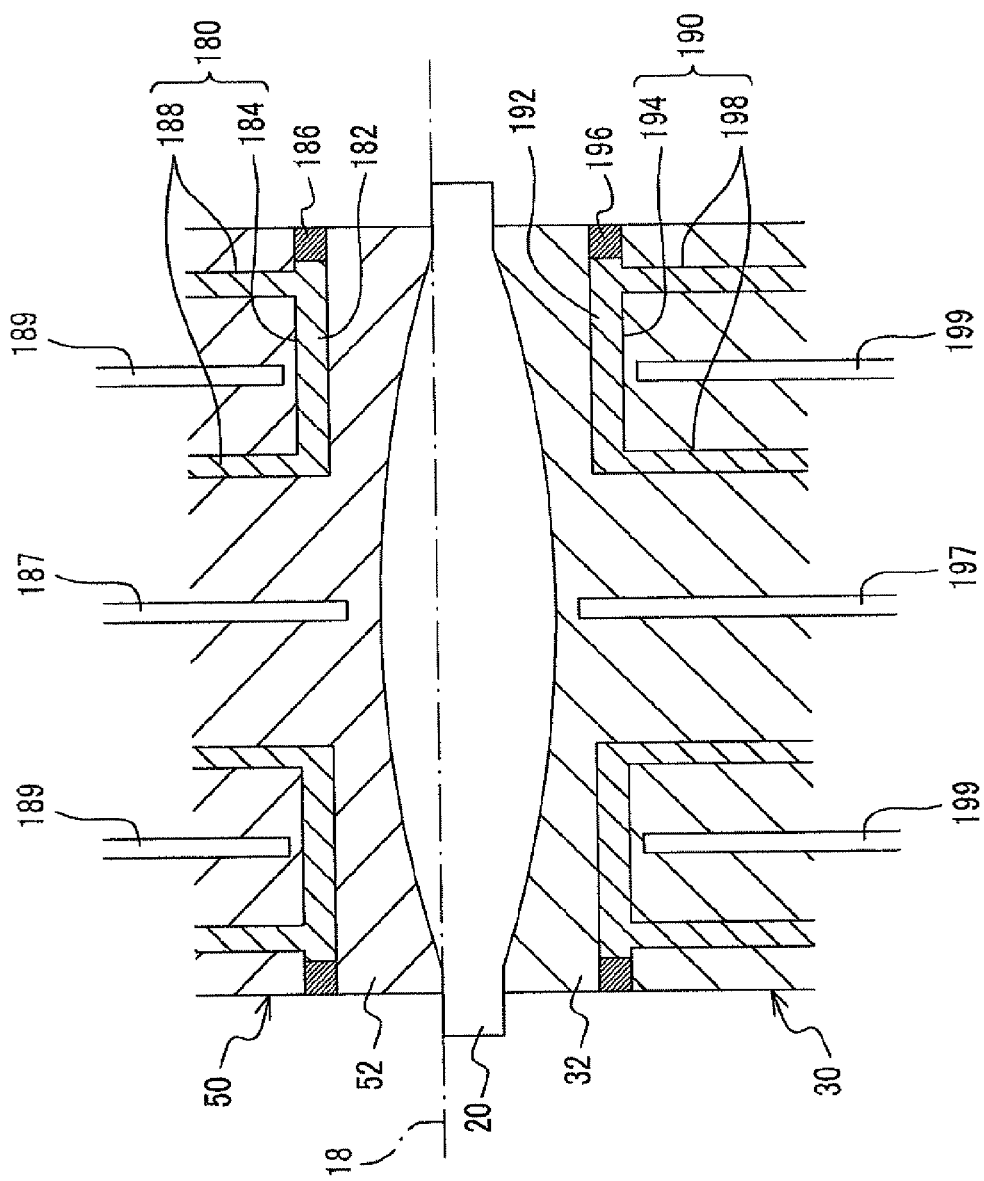
FIG. 7 is a cross-sectional view showing the specific configuration of the temperature adjusting circuit in a movable nest of the movable mold and a nest of the fixed mold.

The second surface circuits 152 and 154 of the first temperature adjusting circuit 100, as shown in FIG. 7, are configured by making oil 182 flow into a channel 180 formed in the nest 52 of the fixed mold 50. In addition, the channel 180 is configured by forming a formation hole 184 formed along the longitudinal direction of the cavity 20 from each side wall of the nest 52, sealing the formation hole 184 using a sealing member 186 by a side wall portion, and forming two connection holes 188 that are formed in a direction orthogonal to each formation hole 184 and are connected to the formation hole 184. A temperature sensor 189 that detects the temperature of each portion 110 (refer to FIG. 2) longitudinally outside the orthogonal section D2 in the second surface 22 of the cavity 20, and a temperature sensor 187 that detects the temperature of the portion 220 (refer to FIG. 2) nearer to the longitudinal central portion than the orthogonal section D2 in the second surface 22 of the cavity 20 are provided in the vicinity of the second surface 22 of the cavity 20.

The second surface circuits 132 and 134 of the first temperature adjusting circuit 100, as shown in FIG. 7, are configured by making oil 192 flow into a channel 190 formed in the movable nest 32 of the movable mold 30. In addition, the channel 190 is configured by forming a formation hole 194 formed along the longitudinal direction of the cavity 20 from each side wall of the movable nest 32, sealing the formation hole 194 using a sealing member 196 by a side wall portion, and forming two connection holes 198 that are formed in a direction orthogonal to each formation hole 194 and are connected to the formation hole 194. A temperature sensor 199 that detects the temperature of each portion 110 (refer to FIG. 2) longitudinally outside the orthogonal section D2 in the second surface 22 of the cavity 20, and a temperature sensor 197 that detects the temperature of the portion 220 (refer to FIG. 2) nearer to the longitudinal central portion than the orthogonal section D2 in the second surface 22 of the cavity 20 are provided in the vicinity of the second surface 22 of the cavity 20.

In the first temperature adjusting circuit 100, temperature adjustment is performed such that the temperature of the pair of first surfaces 21 whose temperature is adjusted by the first surface circuits 151, 153, 155, 157, 131, 133, 135, and 137 becomes higher than the temperature of the pair of second surfaces 22 whose temperature is adjusted by the second surface circuits 152, 154, 132, and 134. At this time, the detection temperature of the temperature sensors is fed back, and a temperature adjustment to a predetermined setting temperature is made. In this way, in the first temperature adjusting circuit 100, the cooling temperature for cooling the molten resin filled into the cavity 20 is managed. Specifically, the temperature of molten resin is set to, for example, 250 to 340° C., and as for the temperature adjustment in the first temperature adjusting circuit 100, the temperature of the pair of second surfaces 22 is set to, for example, 130° C., and the temperature of the pair of first surfaces 21 is set to, for example, 140° C. In addition, the temperature of the second surfaces 22 and the first surfaces 21 are not limited to these temperatures.

In the second temperature adjusting circuit 200, temperature adjustment is performed such that the temperature of the pair of first surfaces whose temperature is adjusted by the first surface circuits 251, 253, 231, and 233 becomes lower than the temperature of the pair of first surfaces 21 whose temperature is adjusted by the first surface circuits 151, 153, 155, 157, 131, 133, 135, and 137 of the first temperature adjusting circuit 100. At this time, the detection temperature of the temperature sensors is fed back, and a temperature adjustment to a predetermined setting temperature is made. In this way, in the second temperature adjusting circuit 200, the cooling temperature for cooling the molten resin filled into the cavity 20 is managed. Specifically, as for the temperature adjustment in the second temperature adjusting circuit 200, the temperature of the pair of first surfaces 21 is set to, for example, 130° C. In addition, the adjustment temperature of the pair of first surfaces 21 in the second temperature adjusting circuit 200 and the adjustment temperature of the pair of second surfaces 22 in the first temperature adjusting circuit 100 may be different from each other.

Accordingly, the relationship in adjustment temperature between the respective circuits may be set to be First surface circuits 151, 153, 155, 157, 131, 133, 135, and 137>Second surface circuits 152, 154, 132, and 134, and First surface circuits 151, 153, 155, 157, 131, 133, 135, and 137>First surface circuits 251, 253, 231, and 233.

(Heat-Insulating Structure in Injection Molding Apparatus 10)

Figure 8:
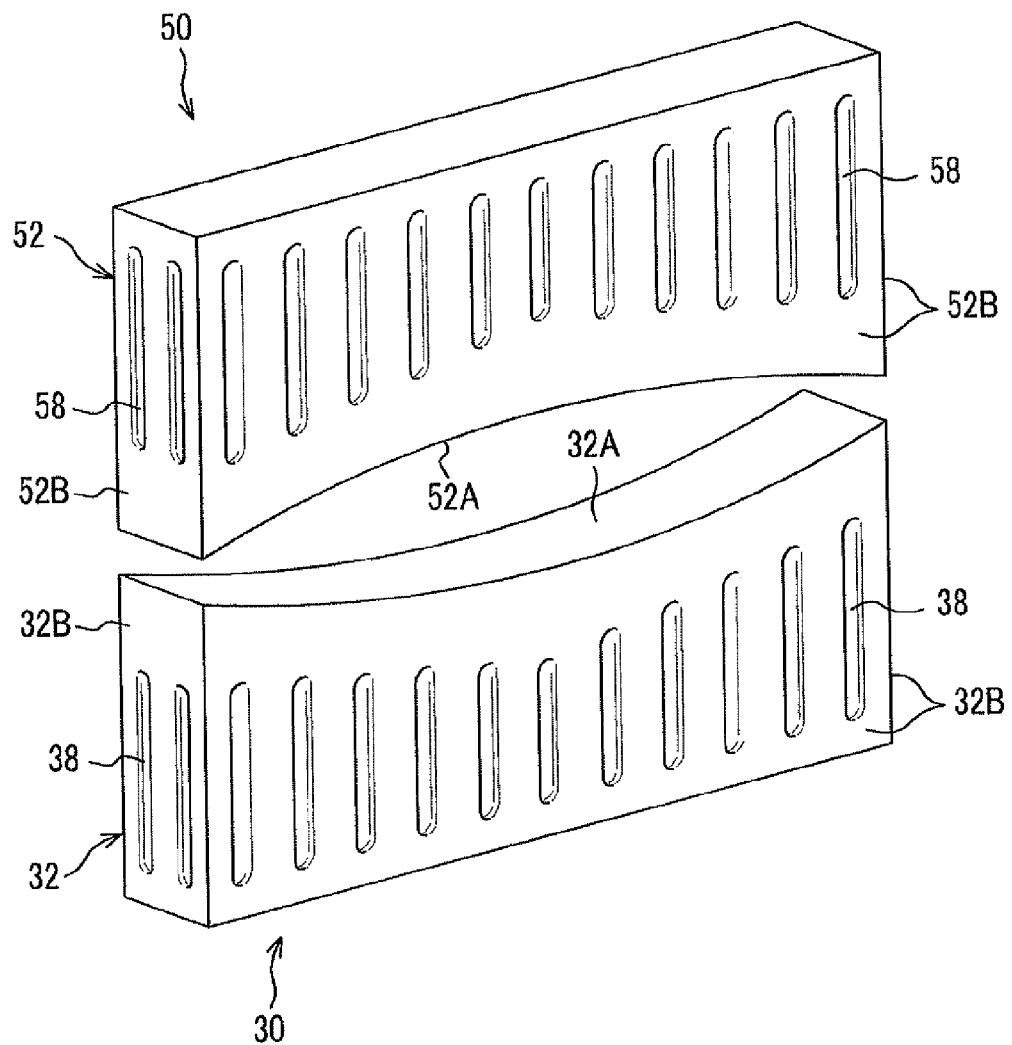
FIG. 8 is a perspective view showing a heat-insulating structure.
Figure 9:
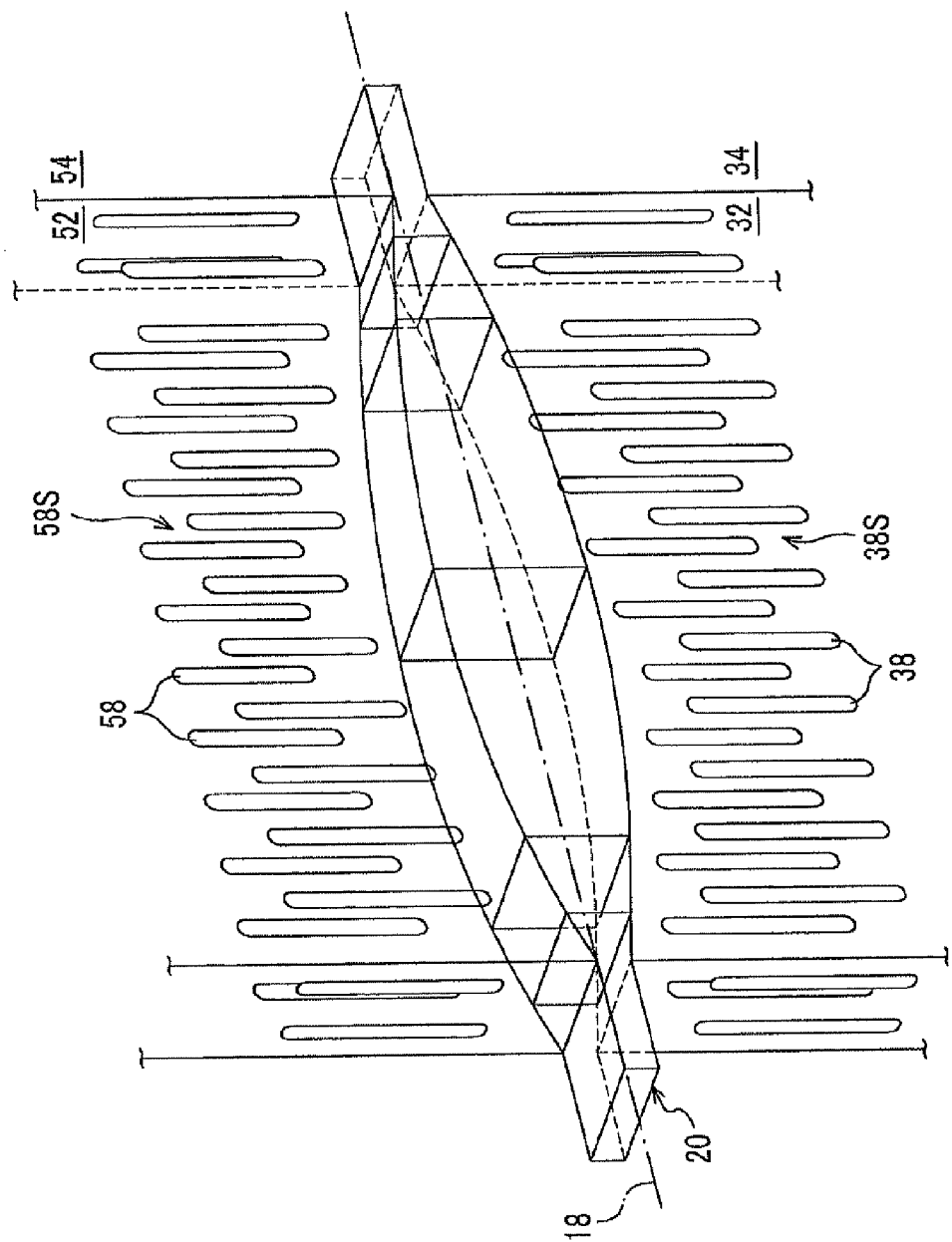
FIG. 9 is a perspective view showing the heat-insulating structure.

FIGS. 8 and 9 are perspective views showing a heat-insulating structure. In addition, a part of the nest 52 and the movable nest 32 are shown in FIG. 8.

In the present exemplary embodiment, as shown in FIG. 8, plural heat-insulating grooves 58 that constitute the heat-insulating structure are formed in four side walls 52B of the nest 52 of the fixed mold 50. The heat-insulating grooves 58 suppress the entrance and exit of heat into/from the nest 52 by air layers within the grooves.

Plural heat-insulating grooves 38 that constitute the heat-insulating structure are formed in four side walls 325 of the movable nest 32 of the movable mold 30. The heat-insulating grooves 38 suppress the entrance and exit of heat into/from the movable nest 32 by air layers within the grooves.

The second surface circuits 152 and 154 are provided in the nest 52, and are present in a space 58S surrounded by the heat-insulating grooves 58 shown in FIG. 9. Thereby, the first surface circuits 151, 153, 155, and 157 provided in the frame nest 54 are present outside the space 58S surrounded by the heat-insulating grooves 58 shown in FIG. 9, and are insulated between the second surface circuits 152 and 154 (refer to FIGS. 5A and 5C).

The second surface circuits 132 and 134 are provided in the movable nest 32, and are present in a space 38S surrounded by the heat-insulating grooves 38 shown in FIG. 9. Thereby, the first surface circuits 131, 133, 135, and 137 provided in the frame nest 34 are present outside the space 38S surrounded by the heat-insulating grooves 38 shown in FIG. 9, and are insulated between the second surface circuits 132 and 134 (refer to FIGS. 5A and 5C).

The heat-insulating structure that insulates between the second surface circuits 152 and 154 and the first surface circuits 151, 153, 155, and 157 and between the second surface circuits 132 and 134 and the first surface circuits 131, 133, 135, and 137 is not limited to the heat-insulating grooves 38 and 58. For example, a heat insulating material composed of a foamed material or the like may be used, and other heat-insulating structures may be used.

(Method for Manufacturing Fθ Lens 300 Using Injection Molding Apparatus 10)

Next, a method for manufacturing the fθ lens 300 using the injection molding apparatus 10 will be described.

In the present manufacturing method first, as shown in FIG. 1, the injection molding apparatus 10 is prepared, the movable mold 30 is moved and clamped to the fixed mold 50 (mold clamping step). Thereby, the cavity 20 serving as a space filled with the molten resin is formed.

Next, the temperature of the cavity 20 is adjusted by the first temperature adjusting circuit 100 and the second temperature adjusting circuit 200 (temperature adjusting step). Specifically, the temperature of the pair of first surfaces 21 is made higher than the temperature of the pair of second surfaces 22 by the first temperature adjusting circuit 100 in the portion (the portion longitudinally outside the orthogonal section D2) 110 (refer to FIG. 2) where Dimension A of the pair of first surfaces 21<Dimension B of the pair of second surfaces 22 is satisfied. The temperature of the pair of first surfaces 21 is made lower than the temperature of the pair of first surfaces 21 in the portion 110 where Dimension A of the pair of first surfaces 21<Dimension B of the pair of second surfaces 22 is satisfied, by the second temperature adjusting circuit 200 in the portion (the portion nearer to the longitudinal central portion than the orthogonal section D2) 220 (refer to FIG. 2) where Dimension A of the pair of first surfaces 21>Dimension B of the pair of second surfaces 22 is satisfied.

Next, the molten resin is poured into the sprue bush 13 provided in the fixed mold 50 from a resin pouring nozzle 12 of the injection molding apparatus 10. The molten resin poured into the sprue bush 13 is injected to the cavity 20 via the sprue 14, the runner 15, and the gate 16, and the cavity 20 is filled with the molten resin (injecting step).

Next, the movable nest 32 of the movable mold 30 is pressurized toward the fixed mold 50, and the resin filled into the cavity 20 is compressed (compressing step). In addition, this compressing step may not be performed.

Next, the molten resin in the cavity 20 is cooled and solidified (solidifying step). By cooling and solidifying the molten resin, the forming surface 52A serving as a transfer surface for molding the emission plane 304 of the fθ lens 300 and the forming surface 32A serving as a transfer surface for forming the incidence plane 302 of the fθ lens 300 is transferred to the resin.

Then, the movable mold 30 is opened with respect to the fixed mold 50, and the fθ lens 300 is manufactured (mold opening step).

Here, the orthogonal sections D1 and D3 (refer to FIG. 2) in the fθ lens 300 of the cavity 20 molded in a case where the temperature of the first surfaces 21 and the second surfaces 22 is made uniform are shown in FIG. 11.

Figure 11B:
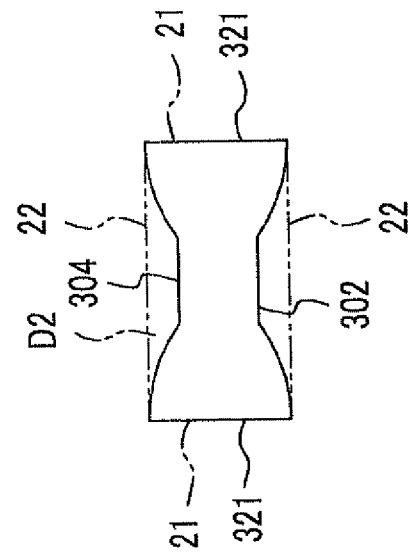
FIGS. 11A and 11B are schematic views showing generation of a sink mark in each section in a comparative example.
Figure 11A:
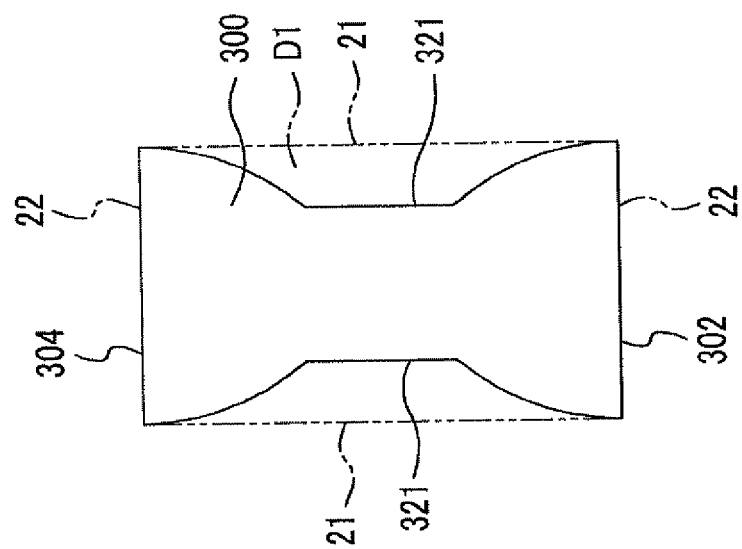

As shown in FIG. 11A, in the portion 220 (refer to FIG. 2) of Dimension A of the pair of first surfaces 21>Dimension B of the pair of second surfaces 22, cooling and solidification of the incidence plane 302 and the emission plane 304 proceeds ahead of faces 321 corresponding to the first surfaces 21.

Thus, the skin layers of the incidence plane 302 and the emission plane 304 are formed ahead of the faces 321. Thereby, a sink mark is generated in the faces 321 where precision is unnecessary, due to contraction of a molded article occurring during cooling and solidification.

On the other hand, as shown in FIG. 11B, in the portion 110 (refer to FIG. 2) where Dimension A of the pair of first surfaces 21<Dimension B of the pair of second surfaces 22 is satisfied, cooling and solidification of the faces 321 corresponding to the first surfaces 21 proceeds ahead of the incidence plane 302 and the emission plane 304. Thus, the skin layers of the faces 321 are formed ahead of the incidence plane 302 and the emission plane 304. Thereby, a sink mark is generated in the incidence plane 302 and the emission plane 304 where precision is necessary, due to contraction of a molded article occurring during cooling and solidification.

Additionally, the first surfaces 21 in the portion 220 (refer to FIG. 2) where Dimension A of the pair of first surfaces 21>Dimension B of the pair of second surfaces 22 is satisfied is longer than the first surfaces 21 in the portion 110 where Dimension A of the pair of first surfaces 21<Dimension B of the pair of second surfaces 22 is satisfied, a difference in the cooling rate is caused, and internal stress is generated in the molded fθ lens 300.

In contrast, in the present exemplary embodiment, the temperature of the pair of first surfaces 21 is made higher than the temperature of the pair of second surfaces 22 by the first temperature adjusting circuit 100 in the portion (the portion longitudinally outside the orthogonal section D2) 110 (refer to FIG. 2) where Dimension A of the pair of first surfaces 21<Dimension B of the pair of second surfaces 22 is satisfied. Thereby, compared to a case shown in FIG. 11B, the solidification rate of the incidence plane 302 and the emission plane 304 becomes faster than the solidification rate of the faces 321. Thereby, a sink mark is suppressed that is generated in the incidence plane 302 and the emission plane 304 where precision is necessary, due to contraction of a molded article occurring during cooling and solidification.

Additionally, in the present exemplary embodiment, the temperature of the pair of first surfaces 21 is made lower than the temperature of the pair of first surfaces 21 in the portion 110 where Dimension A of the pair of first surfaces 21<Dimension B of the pair of second surfaces 22 is satisfied, by the second temperature adjusting circuit 200 in the portion (the portion nearer to the longitudinal central portion than the orthogonal section D2) 220 (refer to FIG. 2) where Dimension A of the pair of first surfaces 21>Dimension B of the pair of second surfaces 22 is satisfied.

Additionally, a difference in cooling rate becomes small between the faces 321 corresponding to the first surfaces 21 in the portion (the portion nearer to the longitudinal central portion than the orthogonal section D2) 220 (refer to FIG. 2) where Dimension A of the pair of first surfaces 21>Dimension B of the pair of second surfaces 22 is satisfied and the faces 321 corresponding to the first surfaces 21 in the portion 110 where Dimension A of the pair of first surfaces 21<Dimension B of the pair of second surfaces 22 is satisfied. Thus, the internal stress generated in the molded fθ lens 300 is reduced.

Second Embodiment

Figure 12:
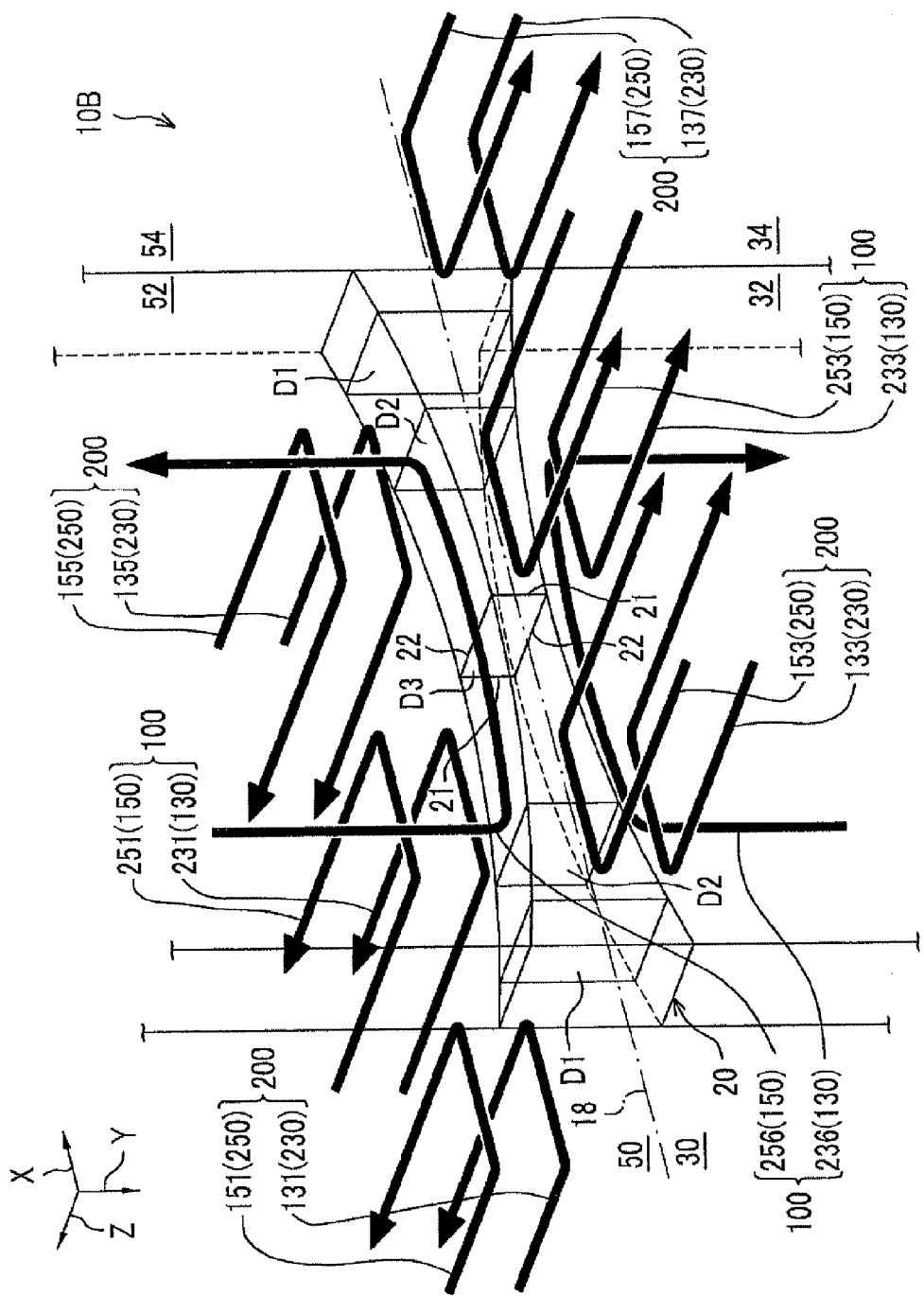
FIG. 12 is a perspective view showing the configuration of a second embodiment.

Next, a second embodiment will be described. FIG. 12 is a perspective view showing the configuration of an injection molding apparatus related to a second embodiment. In addition, portions having the same functions as the first embodiment will be designated by the same reference numerals, and the description thereof will appropriately be omitted.

Figure 13C:
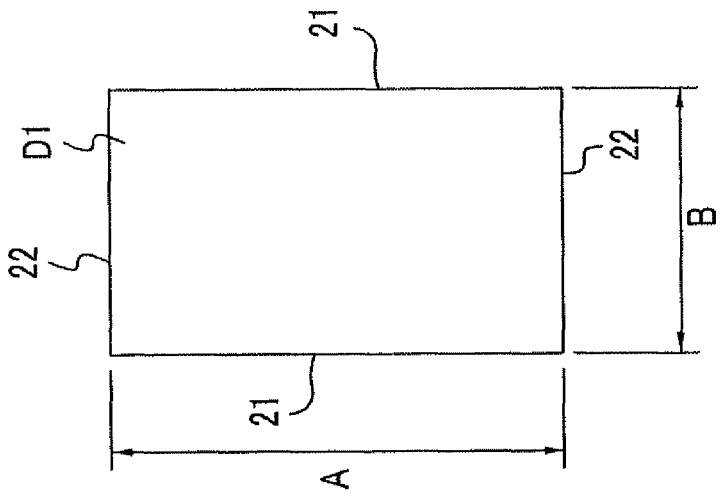
FIGS. 13A to 13C are cross-sectional views showing orthogonal sections orthogonal to the longitudinal direction of a cavity in the second embodiment.
Figure 13B:
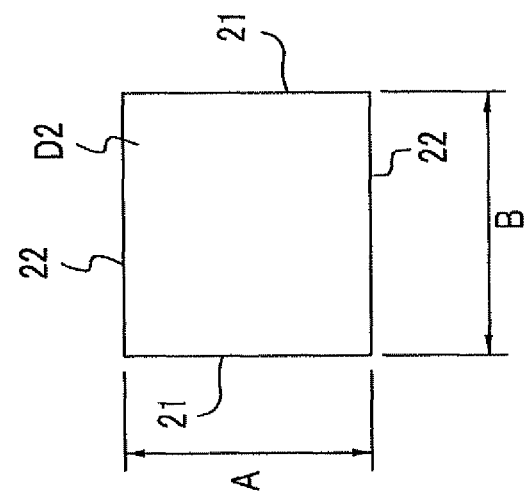
Figure 13A:
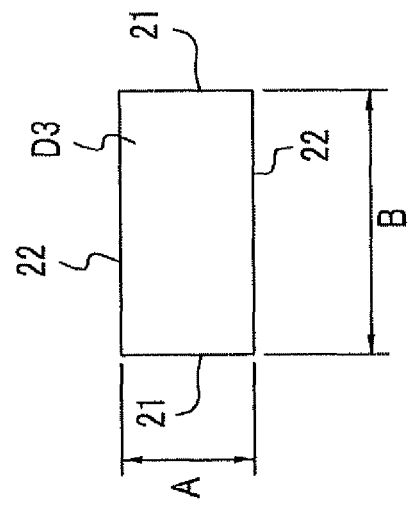

In the cavity 20 related to the second embodiment, as shown in FIG. 12, when orthogonal sections orthogonal to the longitudinal direction of the cavity at the central portion of the cavity 20 in the longitudinal direction (the direction of an arrow X in FIG. 12), outside the central portion in the longitudinal direction, and further outside the central portion in the longitudinal direction (the direction of the arrow X in FIG. 12) are defined as D1, D2, and D3, the relationship between the dimension A of a pair of first surfaces 21 that face each other in a mold opening direction (the direction of an arrow Y in FIG. 12), and the dimension B of a pair of second surfaces 22 that face each other along a direction (the direction of the arrow X in FIG. 12) perpendicular to the mold opening direction is as follows. That is, Dimension A<Dimension B is satisfied in the orthogonal section D3 as shown in FIG. 13A, Dimension A=Dimension. B is satisfied in the orthogonal section D2 as shown in FIG. 13B, and Dimension A>Dimension B is satisfied in the orthogonal section D1 as shown in FIG. 13C.

That is, the cavity 20 includes a portion where the ratio of the dimension A and the dimension B changes continuously such that a portion (the above orthogonal section D2) where the ratio of the dimension A of the pair of first surfaces 21 and the dimension B of the pair of second surfaces 22 becomes 1 in an orthogonal section is generated at a longitudinal intermediate portion.

In the present exemplary embodiment, the second surfaces 22 of the cavity 20 become faces (optical surfaces or the like) where a higher precision than other faces (the first surfaces 21) is required in a long molded article to be molded.

As shown in FIG. 12, the injection molding apparatus 10B related to the second embodiment includes a first temperature adjusting circuit 100 that is provided in the fixed mold 50 and the movable mold 30 to adjust a temperature within a range where the dimension B of the second surfaces 22 is greater than the dimension A of the first surfaces 21. That is, the first temperature adjusting circuit 100 is a circuit that adjusts the temperature of a portion nearer to the longitudinal central portion than the orthogonal section D2 in the cavity 20.

Specifically, the first temperature adjusting circuit 100 includes a circuit 150 for a fixed mold provided at the fixed mold 50, and a circuit 130 for a movable mold provided at the movable mold 30.

The circuit 150 for a fixed mold includes the first surface circuits 251 and 253 in the first embodiment, and a second surface circuit 256 that is provided in the nest 52 of the fixed mold 50 to adjust the temperature of the second surface 22 in the longitudinal central portion of the cavity 20.

The circuit 130 for a movable mold includes the first surface circuits 231 and 233 in the first embodiment, and a second surface circuit 236 that is provided in the movable nest 32 of the movable mold 30 to adjust the temperature of the second surface 22 in the longitudinal central portion of the cavity 20.

The second surface circuit 256 and the second surface circuit 236 are respectively configured similarly to the second surface circuit 154 and the second surface circuit 134 in the first embodiment.

Moreover, the injection molding apparatus 10B includes a second temperature adjusting circuit 200 that is provided in the fixed mold 50 and the movable mold 30 to adjust a temperature within a range where the dimension B of the second surfaces 22 is smaller than the dimension A of the first surfaces 21. That is, the second temperature adjusting circuit 200 is a circuit that adjusts the temperature of a portion longitudinally outside the orthogonal section D2 in the cavity 20.

Specifically, the second temperature adjusting circuit 200 includes a circuit 250 for a fixed mold provided at the fixed mold 50, and a circuit 230 for a movable mold provided at the movable mold 30.

The circuit 250 for a fixed mold includes the first surface circuits 151, 153, 155, and 157 in the first embodiment. The circuit 230 for a movable mold includes the first surface circuits 131, 133, 135, and 137 in the first embodiment.

In the first temperature adjusting circuit 100, temperature adjustment is performed such that the temperature of the pair of first surfaces 21 whose temperature is adjusted by the first surface circuits 251, 253, 231, and 233 becomes higher than the temperature of the pair of second surfaces 22 whose temperature is adjusted by the second surface circuits 236 and 256. In this way, in the first temperature adjusting circuit 100, the cooling temperature for cooling the molten resin filled into the cavity 20 is managed. Specifically, the temperature of molten resin is set to, for example, 250 to 340° C., and as for the temperature adjustment in the first temperature adjusting circuit 100, the temperature of the pair of second surfaces 22 is set to, for example, 130° C., and the temperature of the pair of first surfaces 21 is set to, for example, 140° C. In addition, the temperatures of the second surfaces 22 and the first surfaces 21 are not limited to these temperatures.

In the second temperature adjusting circuit 200, temperature adjustment is performed such that the temperature of the pair of first surfaces whose temperature is adjusted by the first surface circuits 151, 153, 155, 157, 131, 133, 135, and 137 becomes lower than the temperature of the pair of first surfaces 21 whose temperature is adjusted by the first second surface circuits 251, 253, 231, and 233. In this way, in the second temperature adjusting circuit 200, the cooling temperature for cooling the molten resin filled into the cavity is managed. Specifically, as for the temperature adjustment in the second temperature adjusting circuit 200, the temperature of the pair of first surfaces 21 is set to, for example, 130° C. In addition, the adjustment temperature of the pair of first surfaces 21 in the second temperature adjusting circuit 200 and the adjustment temperature of the pair of second surfaces 22 in the first temperature adjusting circuit 100 may be different from each other.

Accordingly, the relationship in adjustment temperature between the respective circuits may be set to be First surface circuits 251, 253, 231, and 233>Second surface circuits 236 and 256, and First surface circuits 251, 253, 231, and 233>First surface circuits 151, 153, 155, 157, 131, 133, 135, and 137.

The second embodiment is also configured to have a heat-insulating structure between the second surface circuits 236, and 256 and the first surface circuits 251, 253, 231, and 233 in the first temperature adjusting circuit 100 similarly to the first embodiment.

Further in the second embodiment, the mold clamping step, the temperature adjusting step, the injecting step, the compressing step, and the mold opening step are performed similarly to the first embodiment. In addition, this compressing step may not be performed.

In the temperature adjusting step in the second embodiment, the temperature of the pair of first surfaces 21 is made higher than the temperature of the pair of second surfaces 22 by the first temperature adjusting circuit 100 in the portion (the portion nearer to the longitudinal central portion than the orthogonal section D2) where Dimension A of the pair of first surfaces 21<Dimension B of the pair of second surfaces 22 is satisfied.

Thereby, compared to a case where temperature is the same in the first surfaces 21 and the second surfaces 22, the solidification rate of the faces (faces corresponding to the second surfaces) where precision is required becomes faster than the solidification rate of the faces (faces corresponding to the first surfaces) where precision is not required. Thereby, a sink mark is suppressed that is generated in the faces where precision is necessary, due to contraction of a molded article occurring during cooling and solidification.

Additionally, in the temperature adjusting step in the second embodiment, the temperature of the pair of first surfaces 21 is made lower than the temperature of the pair of first surfaces 21 in the portion where Dimension A of the pair of first surfaces 21<Dimension B of the pair of second surfaces 22 is satisfied, by the second temperature adjusting circuit 200 in the portion (the portion longitudinally outside the orthogonal section D2) where Dimension A of the pair of first surfaces 21>Dimension B of the pair of second surfaces 22 is satisfied.

Additionally, a difference in cooling rate becomes small between the faces corresponding to the first surfaces 21 in the portion where Dimension A of the pair of first surfaces 21>Dimension B of the pair of second surfaces 22 is satisfied and the faces corresponding to the first surfaces 21 in the portion 110 where Dimension A of the pair of first surfaces 21<Dimension B of the pair of second surfaces 22 is satisfied. Thus, the internal stress generated in a long molded article to be molded is reduced.

Third Embodiment

Next, a third embodiment will be described. FIG. 14 is a perspective view showing the configuration of an injection molding apparatus related to a third embodiment. In addition, portions having the same functions as the first embodiment will be designated by the same reference numerals, and the description thereof will appropriately be omitted.

In the cavity 20 related to the third embodiment, as shown in FIG. 15, when orthogonal sections orthogonal to the longitudinal direction of the cavity at the central portion of the cavity 20 in the longitudinal direction (the direction of an arrow X in FIG. 14), outside the central portion in the longitudinal direction, and further outside the central portion in the longitudinal direction (the direction of the arrow X in FIG. 14) are defined as D1, D2, and D3, the relationship between the dimension A of a pair of first surfaces 21 that face each other in a mold opening direction (the direction of an arrow Y in FIG. 14), and the dimension B of a pair of second surfaces 22 that face each other along a direction (the direction of the arrow X in FIG. 14) perpendicular to the mold opening direction is as follows. That is, Dimension A<Dimension B is satisfied in the orthogonal section D3 as shown in FIG. 15A, Dimension A=Dimension B is satisfied in the orthogonal section D2 as shown in FIG. 15B, and Dimension A>Dimension B is satisfied in the orthogonal section D1 as shown in FIG. 15C.

That is, the cavity 20 includes a portion where the ratio of the dimension A and the dimension B changes continuously such that a portion (the above orthogonal section D2) where the ratio of the dimension A of the pair of first surfaces 21 and the dimension B of the pair of second surfaces 22 becomes 1 in an orthogonal section is generated at a longitudinal intermediate portion.

In the present exemplary embodiment, the first surfaces 21 of the cavity 20 become faces (optical surfaces or the like) where a higher precision than other faces (the second surfaces 22) is required in a long molded article to be molded.

Figure 16:
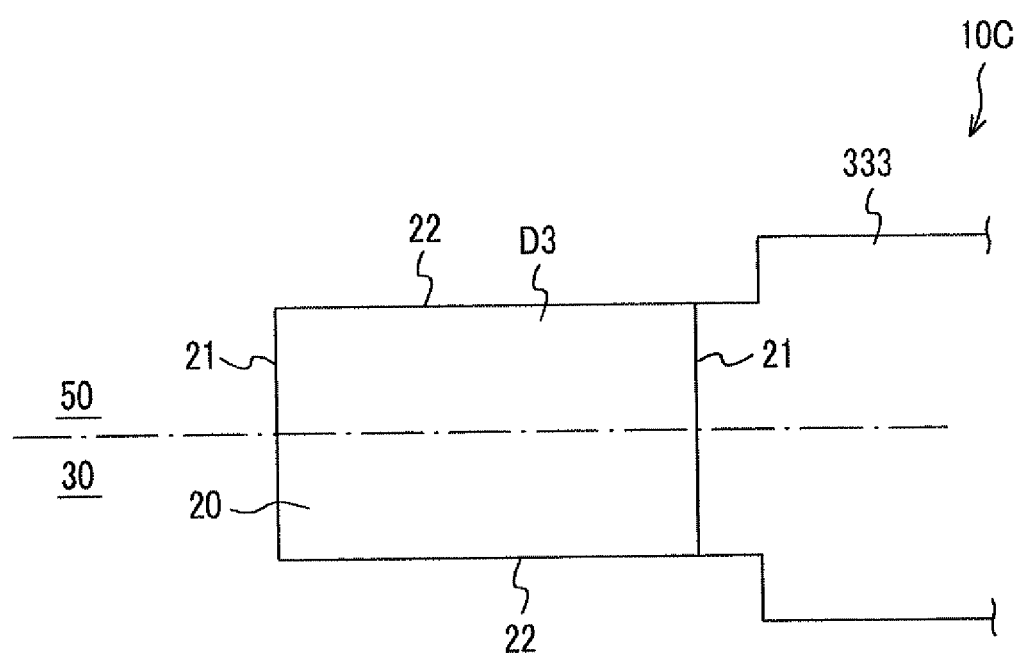
FIG. 16 is a view showing a section on the same plane as an orthogonal section D3 of FIG. 14 in an injection molding apparatus of the third embodiment.

As shown in FIG. 16, an injection molding apparatus 100 related to the third embodiment is provided so as to straddle the fixed mold 50 and the movable mold 30, and includes a movable nest 333 that pressurizes the first surfaces 21 of the cavity 20 along the parting line face 18 to compress the resin filled into the cavity 20. In addition, in the third embodiment, the fixed mold 50 and movable mold 30 do not need to have the movable nest 32 and the nest 52, respectively, and do not need to have a nested structure.

As shown in FIG. 14, the injection molding apparatus 10C related to the third embodiment includes a first temperature adjusting circuit 100 that is provided in the fixed mold 50 and the movable mold 30 to adjust a temperature within a range where the dimension B of the second surfaces 22 is smaller than the dimension A, of the first surfaces 21. That is, the first temperature adjusting circuit 100 is a circuit that adjusts the temperature of a portion longitudinally outside the orthogonal section D2 in the cavity 20.

Specifically, the first temperature adjusting circuit 100 includes a circuit 150 for a fixed mold provided at the fixed mold 50, and a circuit 130 for a movable mold provided at the movable mold 30.

The circuit 150 for a fixed mold includes the first surface circuits 151, 153, 155, and 157 in the first embodiment, and the second surface circuits 152 and 154 in the first embodiment. The circuit 130 for a movable mold includes the first surface circuits 131, 133, 135, and 137 in the first embodiment, and the second surface circuits 132 and 134 in the first embodiment.

Moreover, the injection molding apparatus 10 includes a second temperature adjusting circuit 200 that is provided in the fixed mold 50 and the movable mold 30 to adjust a temperature within a range where the dimension B of the second surfaces 22 is greater than the dimension A of the first surfaces 21. That is, the second temperature adjusting circuit 200 is a circuit that adjusts the temperature of a portion nearer to the longitudinal central portion than the orthogonal section D2 in the cavity 20.

Specifically, the second temperature adjusting circuit 200 includes a circuit 250 for a fixed mold provided at the fixed mold 50, and a circuit 230 for a movable mold provided at the movable mold 30.

The circuit 250 for a fixed mold includes the second surface circuit 256 in the second embodiment. The circuit 230 for a movable mold includes the second surface circuit 236 in the second embodiment.

In the first temperature adjusting circuit 100, temperature adjustment is performed such that the temperature of the pair of second surfaces 22 whose temperature is adjusted by the second surface circuits 152, 154, 132, and 134 becomes higher than the temperature of the pair of first surfaces 21 whose temperature is adjusted by the first surface circuits 151, 153, 155, 157, 131, 133, 135, and 137. In this way, in the first temperature adjusting circuit 100, the cooling temperature for cooling the molten resin filled into the cavity 20 is managed. Specifically, the temperature of molten resin is set to, for example, 250 to 340° C., and as for the temperature adjustment in the first temperature adjusting circuit 100, the temperature of the pair of second surfaces 22 is set to, for example, 140° C., and the temperature of the pair of first surfaces 21 is set to, for example, 130° C. In addition, the temperature of the second surfaces 22 and the first surfaces 21 are not limited to these temperatures.

In the second temperature adjusting circuit 200, temperature adjustment is performed such that the temperature of the pair of second surfaces 22 whose temperature is adjusted by the second surface circuits 256 and 236 becomes lower than the temperature of the pair of second surfaces 22 whose temperature is adjusted by the second surface circuits 152, 154, 132, and 134. In this way, in the second temperature adjusting circuit 200, the cooling temperature for cooling the molten resin filled into the cavity 20 is managed. Specifically, as for the temperature adjustment in the second temperature adjusting circuit 200, the temperature of the pair of second surfaces 22 is set to, for example, 130° C. In addition, the adjustment temperature of the pair of second surfaces 22 in the second temperature adjusting circuit 200 and the adjustment temperature of the pair of first surfaces 21 in the first temperature adjusting circuit 100 may be different from each other.

Accordingly, the relationship in adjustment temperature between the respective circuits may be set to be Second surface circuits 152, 154, 132, and 134>First surface circuits 151, 153, 155, 157, 131, 133, 135, and 137, and Second surface circuits 152, 154, 132, and 134>Second surface circuits 256 and 236.

The third embodiment is also configured to have a heat-insulating structure between the second surface circuits 236, and 256 and the first surface circuits 251, 253, 231, and 233 in the first temperature adjusting circuit 100 similarly to the first embodiment.

Further in the third embodiment, the mold clamping step, the temperature adjusting step, the injecting step, the compressing step, and the mold opening step are performed similarly to the first embodiment. In addition, the compressing step may not be performed.

In the temperature adjusting step in the third embodiment, the temperature of the pair of second surfaces 22 is made higher than the temperature of the pair of first surfaces 21 by the first temperature adjusting circuit 100 in the portion (the portion longitudinally outside the orthogonal section D2) where Dimension A of the pair of first surfaces 21>Dimension B of the pair of second surfaces 22 is satisfied.

Thereby, compared to a case where temperature is the same in the first surfaces 21 and the second surfaces 22, the solidification rate of the faces (faces corresponding to the first surfaces) where precision is required becomes faster than the solidification rate of the faces (faces corresponding to the second surfaces) where precision is not required. Thereby, a sink mark is suppressed that is generated in the faces where precision is necessary, due to contraction of a molded article occurring during cooling and solidification.

Additionally, in the temperature adjusting step in the third embodiment, the temperature of the pair of second surfaces 22 is made lower than the temperature of the pair of second surfaces 22 in the portion where Dimension A of the pair of first surfaces 21>Dimension B of the pair of second surfaces 22 is satisfied, by the second temperature adjusting circuit 200 in the portion (the portion nearer to the longitudinal central portion than the orthogonal section D2) where Dimension A of the pair of first surfaces 21<Dimension B of the pair of second surfaces 22 is satisfied.

Additionally, a difference in cooling rate becomes small between the faces corresponding to the second surfaces 22 in the portion where Dimension A of the pair of first surfaces 21<Dimension B of the pair of second surfaces 22 is satisfied and the faces corresponding to the second surfaces 22 in the portion 110 where Dimension A of the pair of first surfaces 21>Dimension B of the pair of second surfaces 22 is satisfied. Thus, the internal stress generated in a long molded article to be molded is reduced.

The invention is not limited to the above exemplary embodiments, and various modifications, alternations, and improvements may be made. For example, the modifications shown above may be appropriately configured by plural combinations.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An injection molding apparatus comprising:
a first mold;
a second mold that moves relative to the first mold;
the first mold and the second mold being clamped to form a cavity that has a long shape, and includes a portion where a ratio of a first dimension and a second dimension changes continuously such that the portion where the ratio of the first dimension of a pair of first surfaces that face each other along a mold opening direction in a section orthogonal to a longitudinal direction and the second dimension of a pair of second surfaces that face each other along a direction perpendicular to the mold opening direction becomes 1 locates in an intermediate portion of the cavity in a longitudinal direction of the long shape;
a first temperature adjusting circuit that is provided at the first mold and the second mold to adjust a temperature within a range where the second dimension of the second surfaces is greater than the first dimension of the first surfaces such that the temperature of the pair of first surfaces becomes higher than the temperature of the pair of second surfaces, wherein the first temperature adjusting circuit has a first surface circuit that adjusts the temperature of the pair of first surfaces, and a second surface circuit that adjusts the temperature of the pair of second surfaces, and has a heat-insulating structure between the first surface circuit and the second surface circuit; and
a second temperature adjusting circuit that is provided at the first mold and the second mold to adjust a temperature within a range where the second dimension of the second surfaces is smaller than the first dimension of the first surfaces such that the temperature of the pair of first surfaces within the range becomes lower than the temperature of the pair of first surfaces whose temperature is adjusted by the first temperature adjusting circuit.

2. The injection molding apparatus according to claim 1, wherein the second surfaces of the first mold or the second mold are constructed to a movable nest.

3. An injection molding apparatus comprising:
a first mold;
a second mold that moves relative to the first mold;
the first mold and the second mold being clamped to form a cavity that has a long shape, and includes a portion where a ratio of a first dimension and a second dimension changes continuously such that the portion where the ratio of the first dimension of a pair of first surfaces that face each other along a mold opening direction in a section orthogonal to a longitudinal direction, and the second dimension of a pair of second surfaces that face each other along a direction perpendicular to the mold opening direction becomes 1 locates in an intermediate portion of the cavity in a longitudinal direction of the long shape;
a first temperature adjusting circuit that is provided at the first mold and the second mold to adjust a temperature within a range where the second dimension of the second surfaces is smaller than the first dimension of the first surfaces such that the temperature of the pair of second surfaces becomes higher than the temperature of the pair of first surfaces, wherein the first temperature adjusting circuit has a first surface circuit that adjusts the temperature of the pair of first surfaces, and a second surface circuit that adjusts the temperature of the pair of second surfaces, and has a heat-insulating structure between the first surface circuit and the second surface circuit; and
a second temperature adjusting circuit that is provided at the first mold and the second mold to adjust a temperature within a range where the second dimension of the second surfaces is greater than the first dimension of the first surfaces such that the temperature of the pair of second surfaces within the range becomes lower than the temperature of the pair of second surfaces whose temperature is adjusted by the first temperature adjusting circuit.

4. The injection molding apparatus according to claim 3, wherein one of the pair of first surfaces is constructed to a movable nest.

5. A method for manufacturing a long molded article using the injection molding apparatus according to claim 1, the method comprising:
adjusting the temperature of the cavity using the first temperature adjusting circuit and the second temperature adjusting circuit;
injecting molten resin into the cavity, and filling the cavity with the molten resin;
cooling and solidifying the molten resin in the cavity; and
opening the second mold.

6. A method for manufacturing a long molded article using the injection molding apparatus according to claim 3, the method comprising:
adjusting the temperature of the cavity using the first temperature adjusting circuit and the second temperature adjusting circuit;
injecting molten resin into the cavity, and filling the cavity with the molten resin;
cooling and solidifying the molten resin in the cavity; and
opening the second mold.

* * * * *